(12) United States Patent  (10) Patent No.: US 8,790,200 B2
Boissonneault et al.  (45) Date of Patent: Jul. 29, 2014

(54) SAFETY GUARD ASSEMBLY FOR TRANSMISSION MECHANISMS

(75) Inventors: Olivier Boissonneault, Saint-Apollinaire (CA); Clermont Kirouac, Pintendre (CA)

(73) Assignee: Les Distributions Masterfab Inc., Saint-Apollinaire, Quebec (CA)

( * ) Notice: Subject to any disclaimer, the term of this patent is extended or adjusted under 35 U.S.C. 154(b) by 593 days.

(21) Appl. No.: 13/040,478

(22) Filed: Mar. 4, 2011

(65) Prior Publication Data

US 2011/0224040 A1  Sep. 15, 2011

Related U.S. Application Data (60) Provisional application No. 61/312,709, filed on Mar. 11, 2010.

(51) Int. Cl.
*F16H 57/02* (2012.01)
*B23P 11/00* (2006.01)

(52) U.S. Cl.
USPC .......................................................... 474/146

(58) Field of Classification Search
None
See application file for complete search history.

(56) References Cited

U.S. PATENT DOCUMENTS

| | | | | |
|---|---|---|---|---|
| 582,099 A | * | 5/1897 | Salisbury | 474/147 |
| 2,613,544 A | * | 10/1952 | Cullman | 474/88 |
| 3,021,083 A | | 2/1962 | Conley | |
| 3,710,646 A | * | 1/1973 | Bogan | 74/609 |
| 3,811,340 A | * | 5/1974 | Morse | 474/58 |
| 3,885,471 A | * | 5/1975 | Morine et al. | 474/144 |
| 3,927,578 A | * | 12/1975 | Mattila | 74/608 |
| 4,063,358 A | | 12/1977 | Hodge | |
| D252,576 S | * | 8/1979 | Frey | D15/148 |
| 4,290,202 A | | 9/1981 | Nadenoff | |
| 4,425,105 A | | 1/1984 | Edl et al. | |
| 4,615,117 A | * | 10/1986 | Flath | 30/122 |
| 4,908,008 A | | 3/1990 | Gorski | |
| 4,950,113 A | | 8/1990 | Winkler et al. | |
| 5,242,179 A | | 9/1993 | Beddome et al. | |
| 5,400,121 A | | 3/1995 | Foote | |
| 5,438,943 A | * | 8/1995 | Kato et al. | 112/261 |
| 6,186,919 B1 | | 2/2001 | Chen | |
| D540,256 S | * | 4/2007 | Bullock, Jr. | D13/118 |

FOREIGN PATENT DOCUMENTS

GB  256369  8/1926

\* cited by examiner

*Primary Examiner* — William E Dondero
*Assistant Examiner* — Mark K Buse
(74) *Attorney, Agent, or Firm* — Price Heneveld LLP (57) ABSTRACT

A safety guard assembly for enclosing a flexible drive extending between a driving shaft and a driven shaft is provided. The safety guard assembly includes: a back cover having at least two slidably engageable back cover members for varying a length of the back cover, the back cover having at least two shaft openings extending therethrough for receiving a respective one of the driving shaft and the driven shaft therein; and a front cover having at least two slidably engageable front cover members for varying a length of the front cover, the front cover being securable to the back cover for defining an enclosure for the flexible drive. A method for enclosing a transmission mechanism including a flexible drive extending between a driving shaft and a driven shaft is also provided.

11 Claims, 9 Drawing Sheets

SAFETY GUARD ASSEMBLY FOR TRANSMISSION MECHANISMS

CROSS-REFERENCE TO RELATED APPLICATIONS

This application claims priority under 35 USC §119(e) of U.S. provisional patent application 61/312,709 filed Mar. 11, 2010, the specification of which is hereby incorporated by reference.

TECHNICAL FIELD OF THE INVENTION

The technical field relates to safety guard assemblies for machinery and more particularly, it pertains to a protection casing for a transmission mechanism including driving and driven rotary members and means for transmitting torque between both rotary members.

BACKGROUND

Safety guard assemblies, or safety casing, for transmission mechanisms associated with industrial machineries are well known to protect against foreign objects such as debris and clothing as well as to protect the operators from coming into contact with the moving parts of the transmission mechanism. They also prevent the transmission components from causing damage in case of breakage.

Most safety guard assemblies are built for a particular machinery set-up and they cannot be easily adjusted to different transmission mechanisms having different specifications. Therefore, the time requested for designing, machining and installing these safety guard assemblies is relatively important. Furthermore, these safety guards cannot be easily modified to accommodate machinery changes or changes in the position.

Some safety guard assemblies must be entirely removed to either inspect, adjust or replace components of the enclosed transmission mechanism.

There is thus a need for a safety guard assembly which can be adapted to several transmission mechanisms, be relatively easily mounted to the machinery and wherein the enclosed transmission mechanism is relatively easily accessible for inspection, reparation and adjustment.

BRIEF SUMMARY OF THE INVENTION

It is therefore an aim of the present invention to address the above mentioned issues.

According to a general aspect, there is provided a safety guard assembly for enclosing a flexible drive extending between a driving shaft and a driven shaft, the safety guard assembly comprising: a back plate having two slidably engageable back plate sections for varying a length of the back plate, each back plate section having a shaft opening extending therethrough for receiving a respective one of the driving shaft and the driven shaft therein; and a front cover having two slidably engageable front cover sections for varying a length of the front cover, the front cover being securable to the back plate for defining an enclosure for the flexible drive.

In an embodiment, the front cover comprises a front wall and lateral walls extending from the front wall and defining an inner space.

In an embodiment, the back plate sections and the front cover sections are substantially U-shaped.

In an embodiment, the back plate and the front cover are made of plastic.

According to another general aspect, there is provided a safety guard and transmission assembly securable to a machinery frame, comprising: a back cover having two back plate members having a variable overlapping section for varying a length of the back cover, each back plate member having a shaft opening defined therethrough; a transmission including a driving shaft extending through a first one of the shaft openings, a driving rotary member mounted to the driving shaft, a driven shaft spaced-apart from the driving shaft and extending through a second one of the shaft openings, a driven rotary member mounted to the driven shaft and a flexible drive operatively engaged over the driving and driven rotary members; and a front cover having two front cover members having a variable overlapping section for varying a length of the front cover, the front cover being securable to the back cover for defining an enclosure for the flexible drive and the driving and driven rotary members.

In an embodiment, the back plate members are slidably engageable with one another for varying a length of the back cover.

In an embodiment, the front plate members are slidably engageable with one another for varying a length of the front cover.

According to still another general aspect, there is provided a method for enclosing a transmission mechanism including a flexible drive extending between a driving shaft and a driven shaft, the method comprising: adjusting a length of a telescopic back cover including two back cover members having a shaft opening defined therein by displacing the back cover members relatively to one another until each one of the shaft openings is in registry with a respective one of the driving shaft and the driven shaft; inserting the driving shaft and the driven shaft in the respective one of the shaft openings; mounting a driving rotary member to the driving shaft and a driven rotary member to the driven shaft; mounting the flexible drive in an operative configuration to the driving and driven rotary members; adjusting a length of a telescopic front cover including two front cover members by displacing the front cover members relatively to one another until the length of the front cover substantially corresponds to the length of the back cover; and securing the front cover and the back cover into a single safety guard assembly enclosing the transmission mechanism.

According to a further general aspect, there is provided a guard assembly for a transmission mechanism having a frame with two spaced-apart driving wheels and a rotatable and flexible endless drive member therebetween, the guard assembly comprising: a telescopic back cover including two back cover members being slidably engageable with one another for adjusting a length of the back cover and each one of the back cover members being securable to the frame of the transmission mechanism; and a telescopic front cover including two front cover members being slidably engageable with one another for adjusting a length of the front cover and being securable to the telescopic back cover and defining therewith a housing enclosing the two spaced-apart driving wheels and the endless drive member.

According to a general aspect, there is provided a safety guard assembly for enclosing a flexible drive extending between a driving shaft and a driven shaft, the safety guard assembly comprising: a back cover having at least two slidably engageable back cover members for varying a length of the back cover, the back cover having at least two shaft openings extending therethrough for receiving a respective one of the driving shaft and the driven shaft therein; and a front cover having at least two slidably engageable front cover members for varying a length of the front cover, the front cover being securable to the back cover for defining an enclosure for the flexible drive.

According to another general aspect, there is provided a safety guard and transmission assembly securable to a machinery frame, comprising: a back cover having at least two back cover members having a variable overlapping section for varying a length of the back cover, the back cover having at least two shaft openings defined therethrough; a transmission including a driving shaft extending through a first one of the shaft openings, a driving rotary member mounted to the driving shaft, a driven shaft spaced-apart from the driving shaft and extending through a second one of the shaft openings, a driven rotary member mounted to the driven shaft and a flexible drive operatively engaged over the driving and driven rotary members; and a front cover having at least two front cover members having a variable overlapping section for varying a length of the front cover, the front cover being securable to the back cover for defining an enclosure for the flexible drive and the driving and driven rotary members.

According to still another general aspect, there is provided a guard assembly for a transmission mechanism having a frame with two spaced-apart driving wheels and a rotatable and flexible endless drive member therebetween, the guard assembly comprising: a telescopic back cover including at least two back cover members slidably engageable with one another for adjusting a length of the back cover and the back cover being securable to the frame of the transmission mechanism; and a telescopic front cover including at least two front cover members slidably engageable with one another for adjusting a length of the front cover and being securable to the telescopic back cover and defining therewith a housing enclosing the two spaced-apart driving wheels and the endless drive member.

In an embodiment, the front cover members comprise a central front cover member and two front cover end members slidably engageable with the central front cover member, each one of the back cover end members being engageable to a respective end of the central plate member.

In an embodiment, the back cover members comprise a central back plate member and two back cover end members slidably engageable with the central back plate member, each one of the back cover end members being engageable to a respective end of the central back plate member.

In an embodiment, the central front cover member and the central back plate member are superposable to one another and each one of the two front cover end members are superposable and securable to a respective one of the back cover end members. The central front cover member and the central back plate member can be slidably engageable with one another. The central back plate member can comprise guiding tracks extending longitudinally on an inner face thereof and the central front cover member comprises flanges insertable in a respective one of the guiding tracks.

In an embodiment, the front cover end members comprise guiding tracks and the central front cover member comprises flanges slidably insertable in a respective one of the guiding tracks for adjusting the length of the front cover. The flange can be an edge.

In an embodiment, the central back plate member defines an internal channel and the back cover end members slidably insertable in the internal channel for adjusting the length of the back cover and securable to the central back plate member to the selected length.

In an embodiment, the back cover comprises two shaft openings, each one of the shaft openings being defined throughout a respective one of the back cover end members.

In an embodiment, the back cover end members and the front cover end members are made of polymer.

In an embodiment, the central back plate member and the central front cover member are made of one of extruded metal and folded metal section.

In an embodiment, the back cover end members and the central back plate member comprise a plurality of structural ribs.

In an embodiment, the back cover members comprise two back cover members slidably engageable with one another and each one of the shaft openings is defined in a respective of the two back cover members. A first one of the back cover members can comprise guiding tracks and a second one of the back cover members can comprise flanges slidably insertable in a respective one of the guiding tracks.

In an embodiment, each one of the front cover members comprises a front wall and lateral walls extending substantially downwardly from the front wall and defining an inner space.

In an embodiment, the cross-sections of the back cover and the front cover are substantially obround.

According to a further general aspect, there is provided a method for enclosing a transmission mechanism including a flexible drive extending between a driving shaft and a driven shaft, the method comprising: adjusting a length of a telescopic back cover including at least two back cover members and at least two shaft openings by displacing the back cover members relatively to one another until each one of the shaft openings is in registry with a respective one of the driving shaft and the driven shaft; inserting the driving shaft and the driven shaft in the respective one of the shaft openings; mounting a driving rotary member to the driving shaft and a driven rotary member to the driven shaft; mounting the flexible drive in an operative configuration to the driving and driven rotary members; adjusting a length of a telescopic front cover including at least two front cover members by displacing the front cover members relatively to one another until the length of the front cover substantially corresponds to the length of the back cover; and securing the front cover and the back cover into a single safety guard assembly enclosing the transmission mechanism.

In an embodiment, the method further comprises securing the telescopic back cover to a machinery frame.

In an embodiment, the method further comprises securing the at least two back cover members together with a desired overlapped section.

In an embodiment, the method further comprises securing the at least two front cover members together with a desired overlapped section.

BRIEF DESCRIPTION OF THE DRAWINGS

It will be noted that throughout the appended drawings, like features are identified by like reference numerals.

DETAILED DESCRIPTION

Referring now to the drawings, wherein the showings are for the sole purpose of illustrating embodiments of the invention, thus not limiting same.

Figure 1:
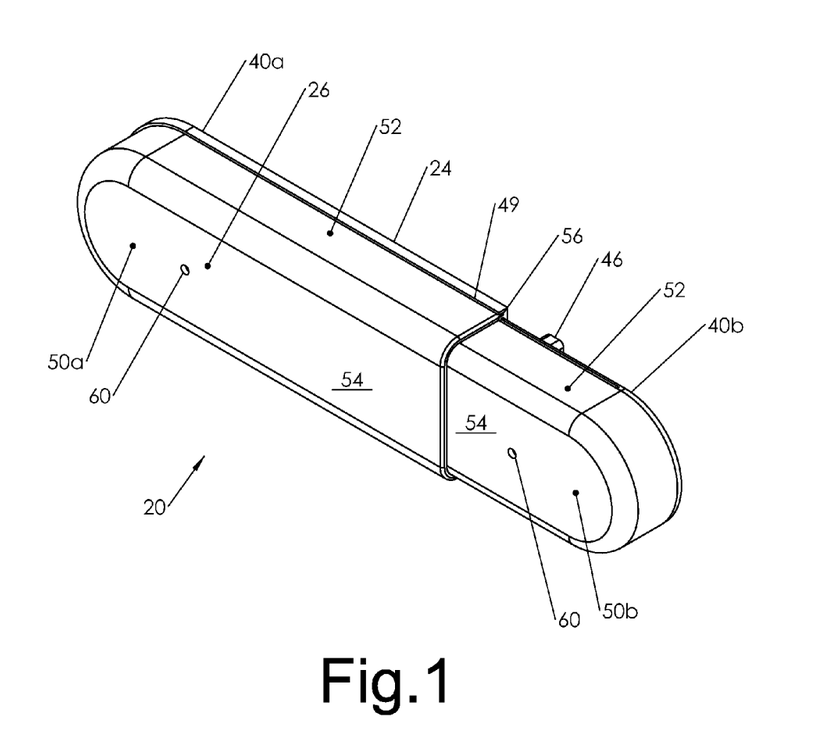
FIG. 1 is a perspective view of a safety guard assembly in a closed configuration in accordance with a first embodiment.
Figure 2:
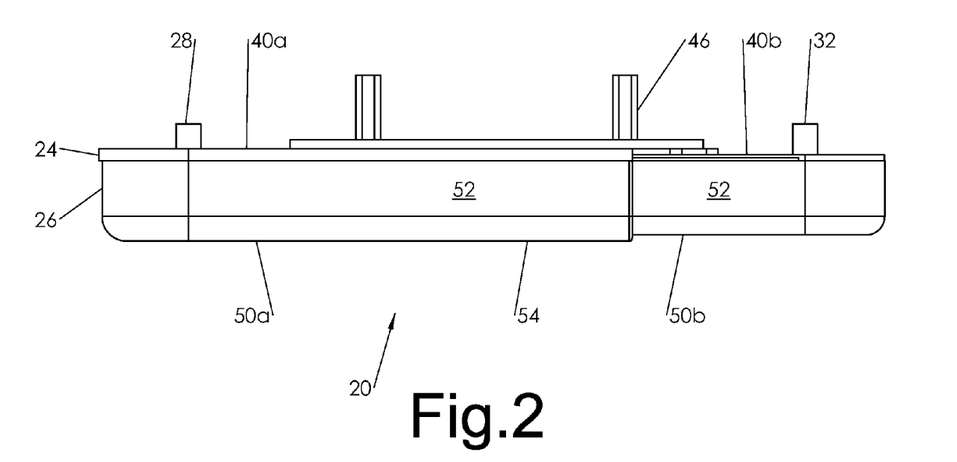
FIG. 2 is a side elevation view of the safety guard assembly shown in FIG. 1, mounted to a frame member of a machinery in accordance with an embodiment.

FIGS. 1 and 2 show a first embodiment of a safety guard assembly 20 positioned about and enclosing a transmission mechanism 22 (FIGS. 3 and 4) for actuating a machinery (not shown) such as, and without being limitative, a conveyor or another machinery having moving components.

The guard assembly 20 includes a telescopic back cover 24 and a telescopic front cover 26, each being formed of two members slidably engaged with one another to vary the length of the resulting safety guard assembly 20 as it will be described in more details below.

Figure 3:
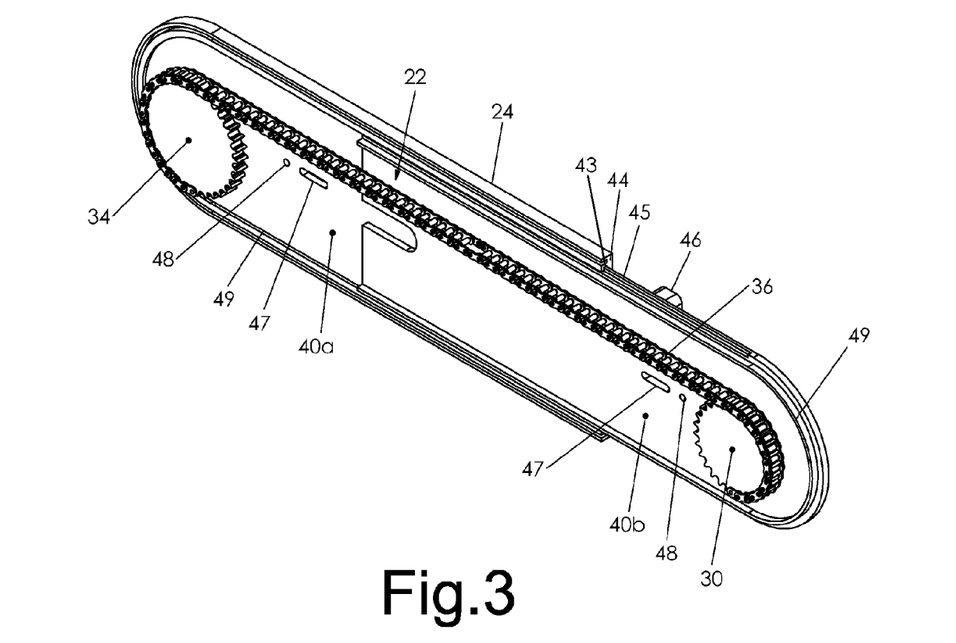
FIG. 3 is a perspective view of a back cover of the safety guard assembly shown in FIG. 1 in accordance with an embodiment, mounted behind a transmission mechanism of the machinery.
Figure 4:
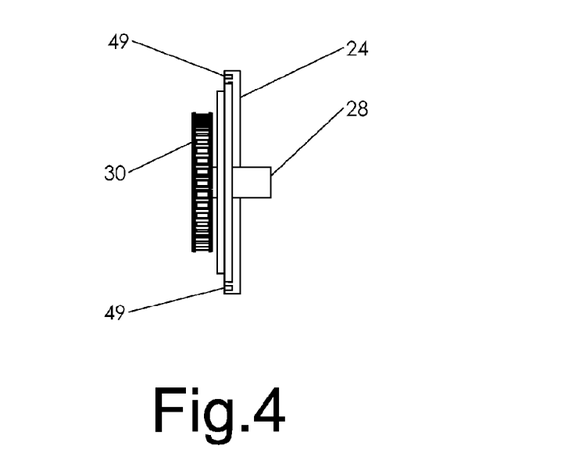
FIG. 4 is a side elevation view of the back cover and the transmission mechanism shown in FIG. 3.

Referring now to FIGS. 3 and 4, it is shown an embodiment of a transmission mechanism 22 which can be enclosed in the safety guard assembly 20. The transmission mechanism 22, or driving assembly, includes a driving shaft 28 operatively connected to a drive motor (not shown), a driving rotary member 30 mounted to the driving shaft 28, a driven shaft 32 spaced-apart from the driving shaft 28, and a driven rotary member 34 mounted to the driven shaft 32. The driven shaft 32 is operationally connected to a driven machinery (not shown) such as a conveyor or another machinery having moving components.

Both rotary members 30, 34 are connected together through a flexible drive 36. In the embodiment shown, the rotary members 30, 34 are gears and the flexible drive 36 is a drive chain. However, it is appreciated that in an alternative embodiment, the rotary members 30, 34 can be pulleys and the flexible drive 36 can be a belt.

As it is well known in the art, rotation of the driving shaft 28 imparts rotation to the entire transmission mechanism 22 and to the driven machinery to which it is operationally connected.

As it will be described in more details below, the transmission mechanism 22 including sections of the driving and driven shafts 28, 32, both rotary members 30, 34 and the flexible drive 36 are enclosed in the safety guard assembly 20 during operation.

Figure 5:
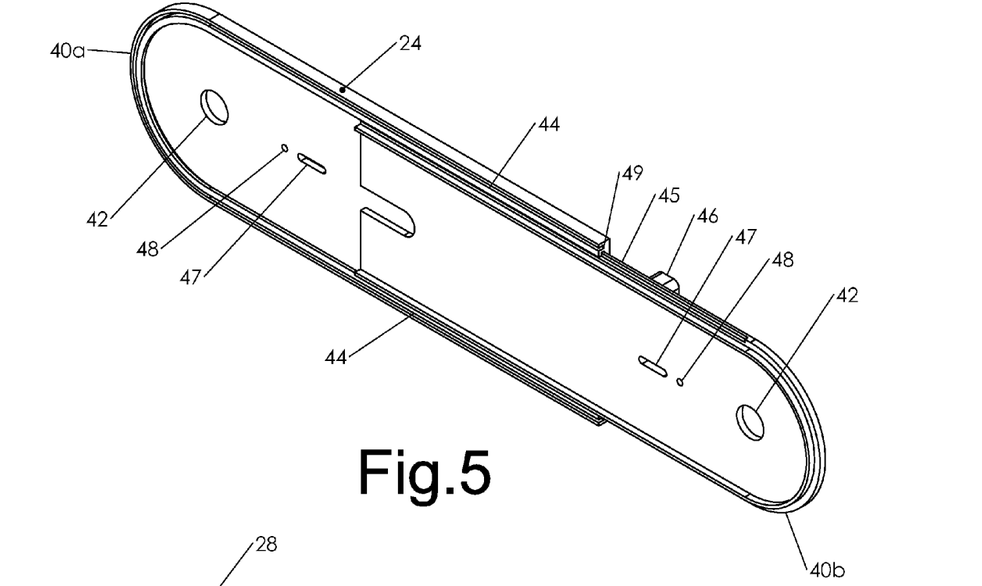
FIG. 5 is a perspective view of the back cover of the safety guard assembly shown in FIG. 3.

Referring now to FIGS. 3 and 5, there is shown an embodiment of the telescopic back cover 24 in the shape of a back plate having two back cover members 40a, 40b slidably engaged with one another. The back cover members 40a, 40b are telescopically displaceable relatively to one another to adjust the length of the resulting back cover 24. Each one of the back cover members 40a, 40b is substantially half obround shaped, each one has a shaft opening 42 extending therethrough for receiving a respective one of the driving shaft 28 and the driven shaft 32 of the transmission mechanism 22. More particularly, the driving shaft 28 and the driven shaft 32 extend through the shaft openings 42 defined in the back plate members 40a, 40b when enclosed in the safety guard assembly 20. The rotary members 30, 34 carried by the driving shaft 28 and the driven shaft 32 are located forwardly of the back cover 24, inside the enclosure. In a non-limitative embodiment, the shape of the shaft opening 42 substantially corresponds to the shape of the shaft which will be inserted therein. In the embodiment shown, the shaft opening 42 is substantially circular.

One of the back plate members 40a, 40b is slightly wider than the other one. The wider back plate member 40a has guiding tracks 44 with a guiding channel 43 defined inwardly in which an outer protruding flange 46 (or edge) of the other back plate member 40b is slidably engageable. Thus, the length of the overlapped portions of the back plate members 40a, 40b is adjustable to vary the length of the telescopic back cover 24 in accordance with the length of the transmission mechanism 22 which will be enclosed therein and, more particularly, the distance between the driving and the driven shafts 28, 32.

More particularly, for a transmission mechanism 22 having a short length, the overlapped portion of the back plate members 40a, 40b is substantially long, while for a longer transmission mechanism 22, i.e. the distance between the driving and driven shafts 28, 32 is longer, the overlapped portion of the back plate members 40a, 40b is substantially smaller.

Figure 6:
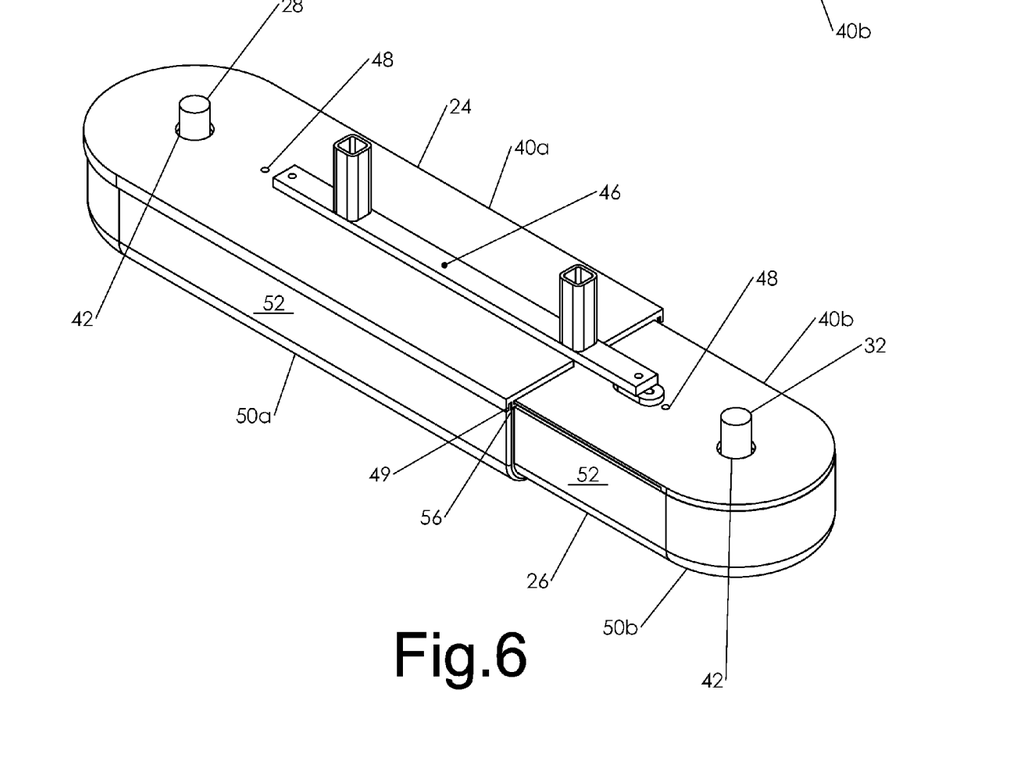
FIG. 6 is a rear perspective view of the safety guard assembly shown in FIG. 1 mounted to the frame member of the machinery.

The back cover 24 and, more particularly, the back plate members 40a, 40b are secured to a frame 46 of the machinery in a fixed position as it is shown in FIGS. 2 and 6. The back plate members 40a, 40b can be fastened to the frame 46 with appropriate fasteners or welded thereto as it is known in the art. In the embodiment shown, each one of the back plate members 40a, 40b has an elongated slot 47 defined therein. The slot is juxtaposed to the frame 46 and fasteners, such as bolts, screws and the like, are inserted therein and secured to the frame 46 as it is known in the art. Each one of the back plate members 40a, 40b has a fastener opening 48 defined herein, the purpose of which will be described in more details below. Furthermore, the back plate members 40a, 40b have a U-shaped elongated groove 49 extending peripherally, the purpose of which will be described in more details below.

Figure 7:
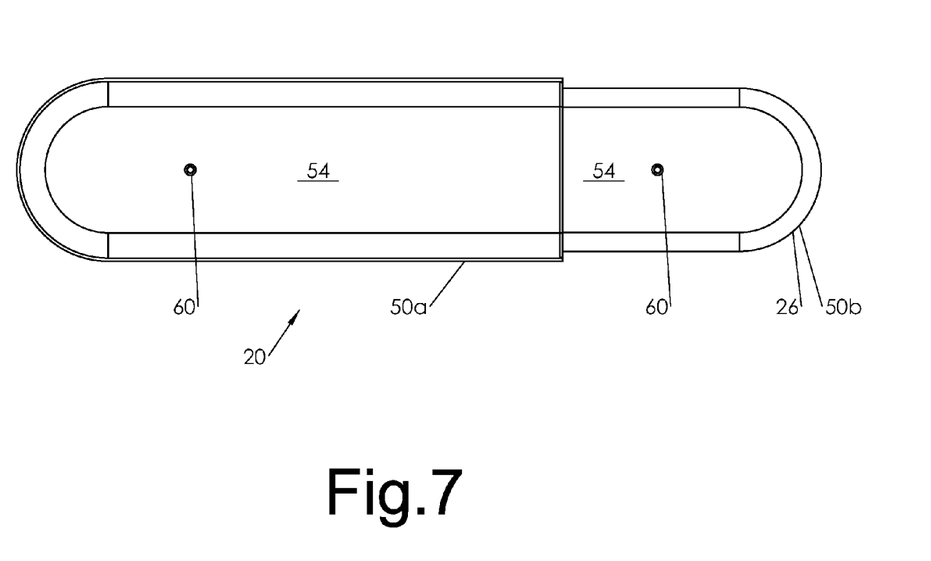
FIG. 7 is a front elevation view of the safety guard assembly shown in FIG. 1.

Turning now to FIGS. 1, 2, and 7, there is shown an embodiment of the telescopic front cover 26 engageable with the back cover 24 for forming the safety guard assembly 20 having an enclosure defined therein.

Figure 8:
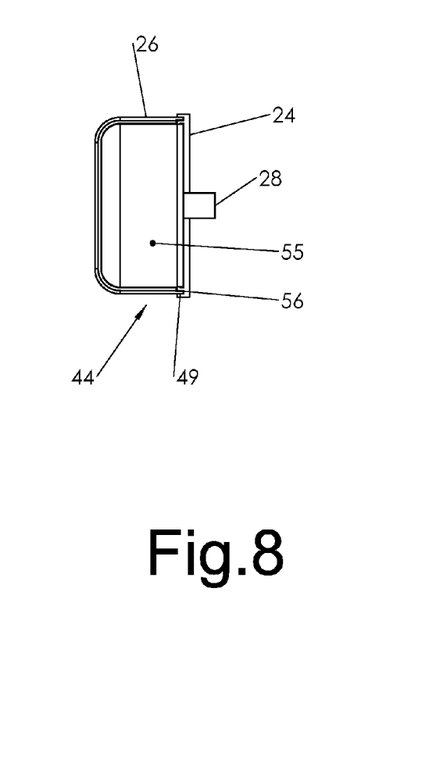
FIG. 8 is a sectional view of the safety guard assembly shown in FIG. 1.

As the telescopic back cover 24, the telescopic front cover 26 includes two front cover members 50a, 50b slidably engageable with one another. The front cover members 50a, 50b are telescopically displaceable relatively to one another to adjust the length of the resulting front cover 26. Each one of the front cover members 50a, 50b is substantially half obround shaped, which substantially corresponds to the shape of the back cover members 40a, 40b and have a U-shaped cross-section. In the embodiment shown, the back cover 24 is substantially flat and the front cover 26 has lateral walls 52 protruding substantially downwardly from a front wall 54 to define an inner space 55, shown in FIG. 8, wherein the transmission mechanism 22 can be inserted in the closed configuration of the safety guard assembly 20. It is appreciated that in an alternative embodiment (not shown), the front cover 26 can be substantially flat and the back cover 24 can have a substantially U-shaped cross-section with lateral walls protruding from a back wall to define the inner space 55 wherein the transmission mechanism 22 can be inserted in the closed configuration of the safety guard assembly 20. In still another embodiment (not shown), both the front cover 26 and the back cover 24 can have a substantially U-shaped cross-section with lateral walls protruding respectively from a front wall and a back wall to define the inner space 55.

As the back cover members 40a, 40b, the front cover members 50a, 50b have a different width and, more particularly, one of the front cover members 50a is slightly wider than the other front cover members 50b. The narrower front cover member 50b is slidably engageable in the wider front cover member 50a for sliding displacement of both front cover members 50a, 50b, relatively to one another. Thus, the length of the overlapped portion of the front plate members 50a, 50b is adjustable to vary the length of the telescopic front cover 26 in accordance with the length of the transmission mechanism 22 which will be enclosed therein and with the length of the back cover 24.

The telescopic front cover 26 is superposed and secured to the telescopic back cover with the transmission mechanism 22 extending therebetween to define the safety guard assembly 20. More particularly, the edges 56 of the lateral walls 52 are insertable in the peripheral elongated grooves 49 defined in an inner face of one of the back cover members 40a, 40b and juxtaposable to a peripheral wall protruding from the inner face of the other one of the back cover members 40a, 40b. Thus, the insertion of the edges 56 in the peripheral elongated grooves 49 ensures that the length of the front cover 26 corresponds to the length of the back cover 24 and that they can be secured together as it will be described in more details below.

As the back cover members 40a, 40b, each one of the front cover members 50a, 50b has a fastener opening 60 defined in its front walls 54. The fastener openings 60 defined in the front cover members 50a, 50b are in registry with the fastener openings 48 defined in the back cover members 40a, 40b when the back and front covers 24, 26 are engaged together. Fasteners (not shown), such as bolts or nails, can be inserted continuously in the fastener openings 48, 60 for securing the front cover 26 to the back cover 24 and define the casing in which the transmission mechanism 22 is hidden. As mentioned above, the insertion and the juxtaposition of the edges 56 in the peripheral elongated grooves 49 defined in one of the back cover members 40a, 40b and against the peripheral wall protruding from the inner face of the other one of the back cover members 40a, 40b ensures that the length of the front cover 26 corresponds to the length of the back cover 24 and that the fastener openings 60 defined in the front cover members 50a, 50b are in registry with the fastener openings 48 defined in the back cover members 40a, 40b.

For mounting the safety guard assembly 20 to the machinery and enclosing its transmission mechanism 22, the back plate 24 is first mounted to the machinery frame 46 with the driving and driven shafts 28, 32 extending through the shaft openings 42 defined therein. The length of the back cover 24 is first adjusted in accordance with the distance between both shafts 28, 32 by telescopically displacing the back cover members 40a, 40b with respect to one another. Then, the rotary members 30, 34 of the transmission mechanism 22 are mounted to their respective shafts 28, 32 and the flexible drive 36 is operatively engaged over both rotary members 28, 32. Then, the length of the front cover 26 is adjusted to the length of the back cover 24 and the distance between both shafts 28, 32 by telescopically displacing the front cover members 50a, 50b with respect to one another. The front cover 26 is juxtaposed to the back cover 24 and encloses the transmission mechanism 22. Fasteners (not shown) are inserted in the fastener openings 48, 60 defined in the back and front cover members 40a, 40b, 50a, 50b, to secure the telescopic back and front covers 24, 26 into a single safety assembly 20.

For maintenance, replacement or any other purposes which require access to the transmission mechanism 22, the fasteners are detached and only the front cover 26 is removed. Thus, a relatively easy and quick access is provided to the transmission mechanism 22 since the front cover 26 is releasably mounted to the back cover 24.

It is appreciated that the same components can be used to enclose transmission mechanisms 22 having different specifications including various lengths. The length of the telescopic casing can be adjusted to the length of the transmission mechanism and, more particularly the distance between the driving shaft 28 and the driven shaft 32. The width of front and back covers 26, 24 can be adapted to the diameter of the rotary members 30, 34. For instance and without being limitative, front and back covers 26, 24 can be provided in widths having between seven and eleven inches for housing transmission mechanisms 22 having rotary members 30, 34 of six inches or less and ten inches or less respectively. In another embodiment, thirteen inch wide front and back covers 26, 24 can be provided for housing transmission mechanisms 22 having rotary members 30, 34 of twelve inches or less. It is appreciated that the width of the front and back covers 26, 24 is not limitative. Thus, a relatively small number of components produced in standard sizes can be used to manufacture safety casings suitable for transmission mechanisms of various lengths. Furthermore, the number of moving components in the telescopic safety guard assembly is relatively small.

It is appreciated that the shape of the various components defined in the safety guard assembly 20 can vary greatly from the one shown in the figures and described above. Moreover, the mechanism used for the sliding engagement of the back and front cover members 40a, 40b, 50a, 50b can vary from the ones shown in the figures and described above.

The safety guard assembly 20 can be made of several materials such as plastic, metal including aluminium and steel and the like.

Referring now to FIGS. 9 to 15, there is shown an alternative embodiment of the safety guard assembly wherein the features are numbered with reference numerals in the 100 series which correspond to the reference numerals of the previous embodiment. As it will be described in more details below, the front and back covers 126, 124 of the safety guard assembly 120 include three slidably engageable members each.

Figure 9:
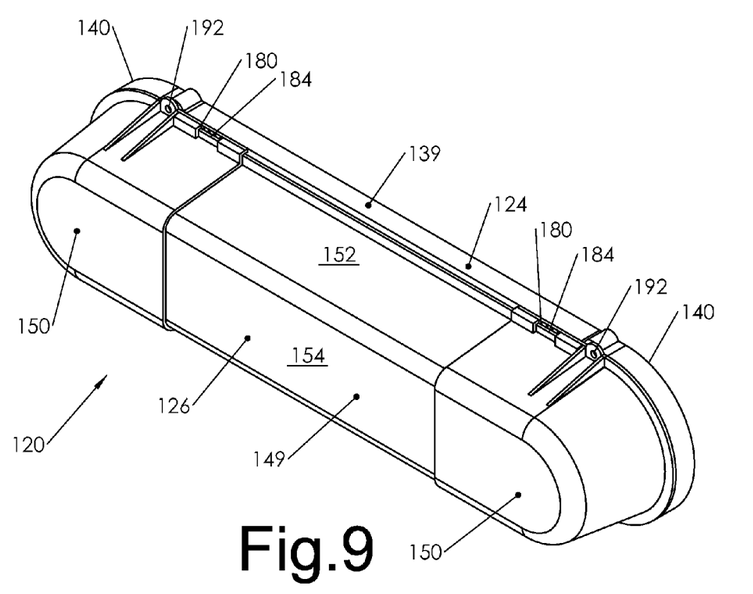
FIG. 9 is a perspective view of the safety guard assembly in a closed configuration in accordance with a second embodiment.

As for the above-described guard assembly 20, the guard assembly 120 includes a telescopic back cover 124 and a telescopic front cover 126, each being formed of three members slidably engaged with one another to vary the length of the resulting safety guard assembly 120.

Figure 11:
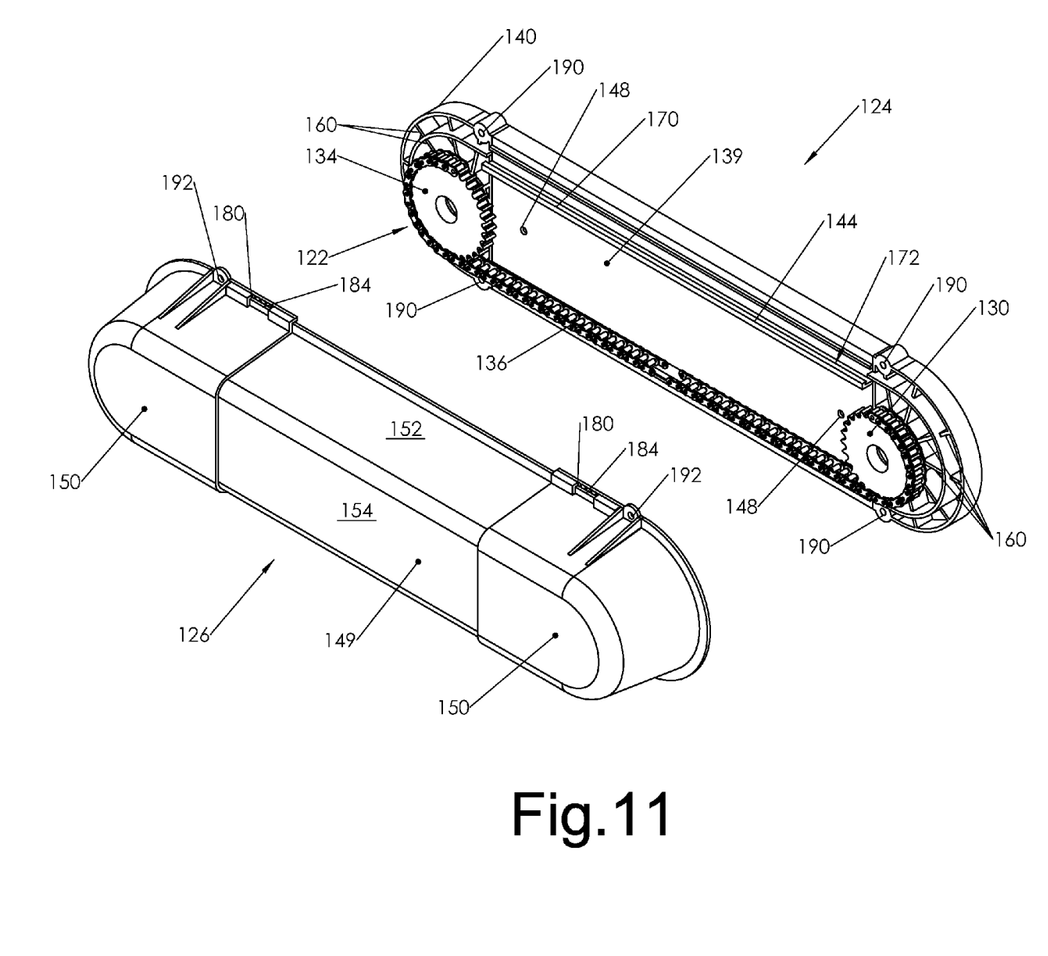
FIG. 11 is a perspective view of the safety guard assembly shown in FIG. 9 showing the back cover of FIG. 10 having a transmission mechanism superposed thereto and a front cover securable to the back cover, the safety guard assembly being configured in an open configuration providing access to the transmission mechanism.

As shown in FIG. 11, a transmission mechanism 122 including a driving shaft (not shown), a driving rotary member 130, a driven shaft (not shown), a driven rotary member 134, and a flexible drive 136, can be enclosed in the safety guard assembly 120.

The safety guard assembly 120 is configurable in a closed and operative configuration preventing access to the transmission mechanism 122 and an open configuration allowing access to the transmission mechanism 122 for maintenance purposes, for instance.

Figure 10:
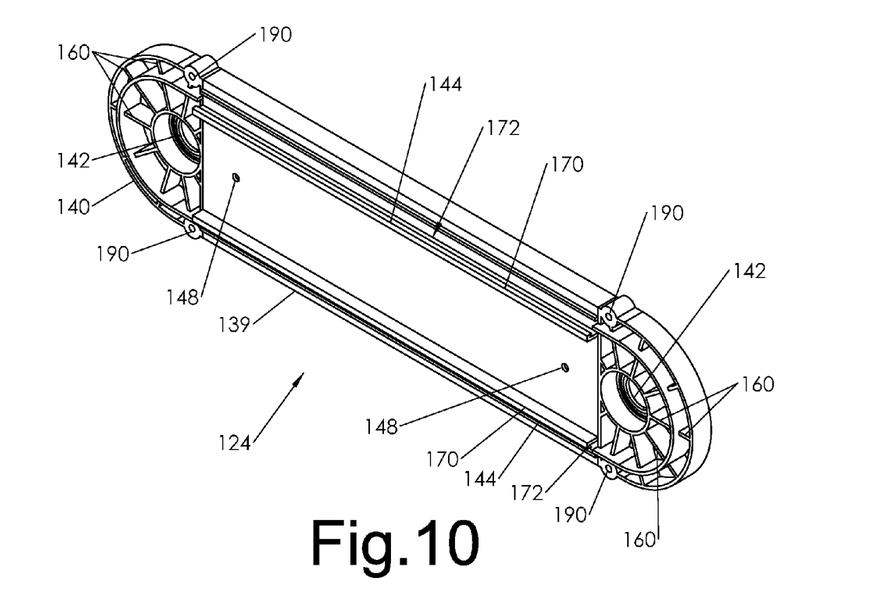
FIG. 10 is a perspective view of a back cover of the safety guard assembly shown in FIG. 9 in accordance with an embodiment securable to a machinery frame (not shown) and behind a transmission mechanism (not shown)
Figure 12:
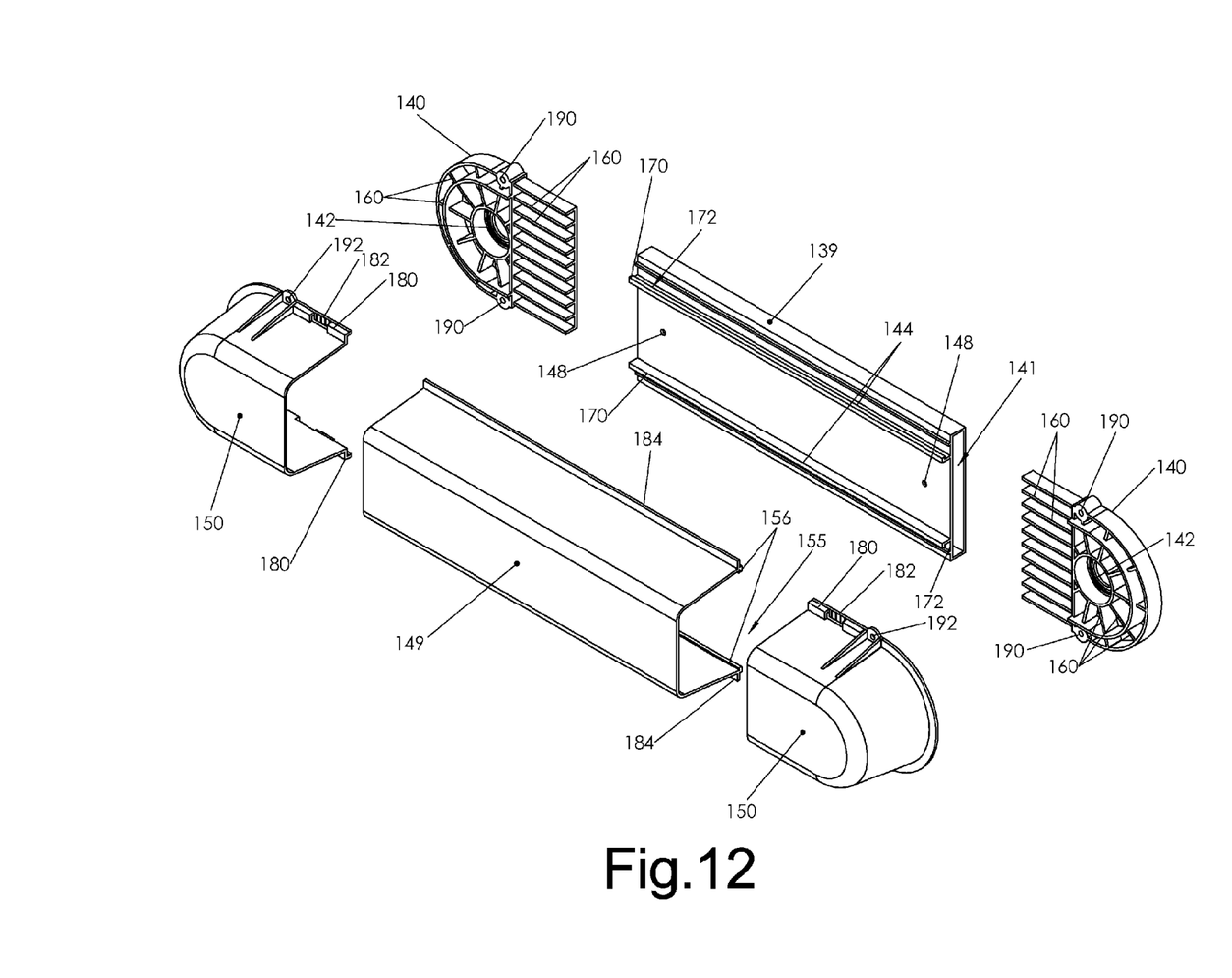
FIG. 12 is a perspective view, exploded, of the safety guard assembly shown in FIG. 9.

Referring now to FIGS. 10 and 12, there is shown that the telescopic back cover 124 is in the shape of a back plate having a central back cover plate 139 and two back cover end members 140 slidably engageable with the central back cover plate 139. More particularly, each one of the back cover end members 140 is slidably engageable with the central back cover plate 139 at a respective end thereof. The back cover end members 140 are telescopically displaceable relatively to the central back cover plate 139 to adjust the length of the resulting back cover 124. Each one of the back cover end members 140 is substantially half obround shaped and the central back cover plate 139 is substantially rectangular shaped. The central back cover plate 139 has an internal channel 141 of a substantially rectangular cross-section defined therein in which the back cover end members 140 are slidably insertable. The width of the back cover end members 140 at their insertable end is slightly narrower than the width of the channel 141 to be slidably engageable therein and vary the length of the resulting back cover 124.

Each one of the back cover end members 140 has a shaft opening 142 extending therethrough for receiving a respective one of the driving shaft and the driven shaft of the transmission mechanism 122. More particularly, the driving shaft and the driven shaft extend through the shaft openings 142 defined in the back cover end members 140 when enclosed in the safety guard assembly 120. The rotary members 130, 134 carried by the driving shaft and the driven shaft are located forwardly of the back cover 124, inside the enclosure. In a non-limitative embodiment, the rotary members 130, 134 are at least partially superposed to a respective one of the back cover end members 140.

Figure 13:
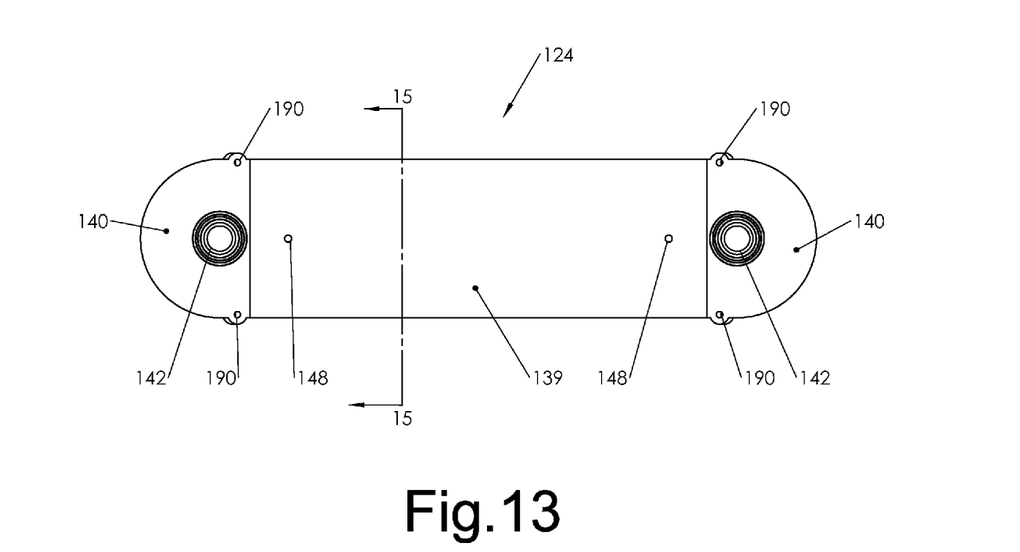
FIG. 13 is a rear plan view of the back cover shown in FIG. 10.

The back cover end members 140 have a plurality of reinforcing ribs 160 protruding upwardly from a back face thereof to reinforce the structure of the back cover end members 140.

Figure 14:
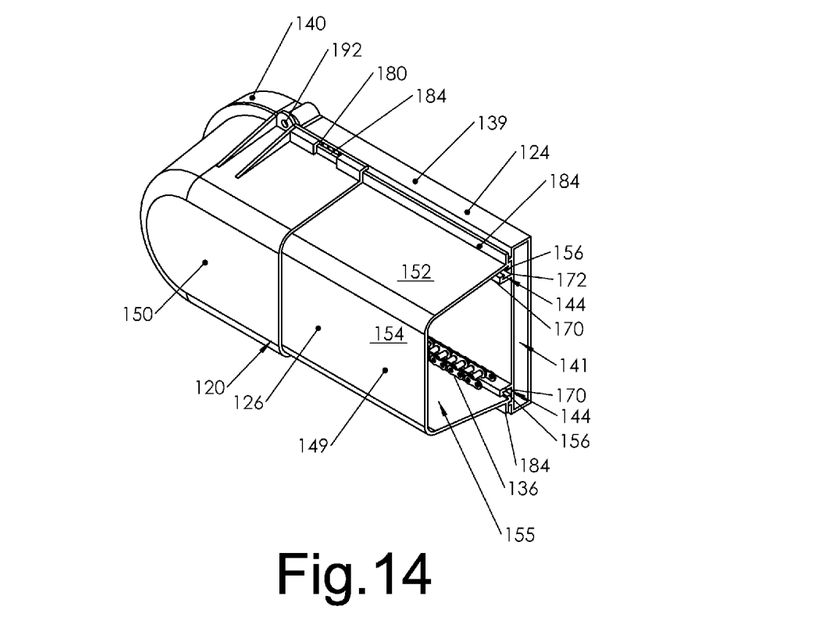
FIG. 14 is a perspective view of the safety guard assembly shown in FIG. 9, sectioned transversally.
Figure 15:
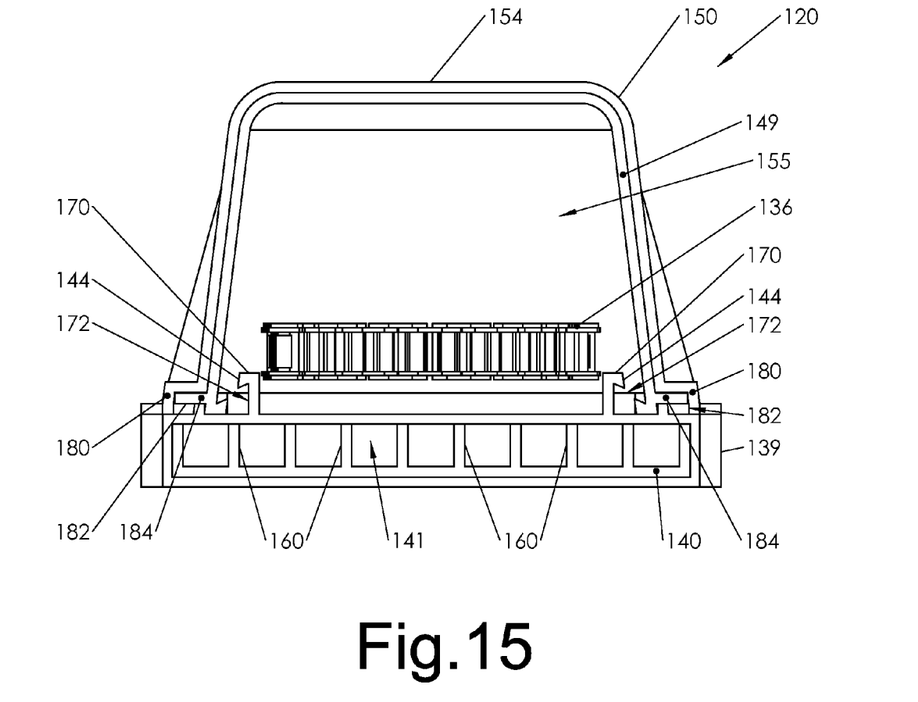
FIG. 15 is a sectional view along section lines 15-15 of the safety guard assembly shown in FIG. 9.

Referring now to FIGS. 14 and 15, there is shown that the central back cover plate 139 has two substantially parallel guiding tracks 144. Each one of the guiding tracks 144 extends longitudinally on a respective side of the central back cover plate 139 and includes an L-shaped wall 170 defining a guiding channel 172. The guiding tracks 144 are outwardly oriented. Their purpose will be described in further details below.

As for the back cover 24, the back cover 124 is securable to a frame (not shown) of the machinery in a fixed position. More particularly, in the embodiment shown, the central back cover plate 139 has two spaced-apart fastener openings 148 extending therethrough, each one of the fastener openings includes two holes in register defined in the two spaced-apart walls of the central back cover plate 139. The outer face of the back cover 124 is juxtaposed to the frame of the machinery and fasteners, such as bolts, screws and the like, which are inserted in the fastener openings 148 and secured to the frame as it is known in the art. One skilled in the art will appreciate that, in a non-limitative alternative embodiment, the spaced-apart fastener openings 148 can extend throughout the back cover end members 140. Furthermore, in other alternative embodiments, the back cover 124 can be fastened to the machinery frame with appropriate fasteners or welded thereto as it is known in the art.

Each one of the back cover end members 140 has a fastener elongated slot (not shown) extending therethrough. The fastener elongated slots are configured to be in register with a respective one of the fastener openings 148 defined in the central back cover plate 139 when the back cover end members and the central back cover plate 139 are engaged together. The length of the elongated slots allow variation of the length of the resulting back cover 124. Fasteners (not shown), such as bolts or nails, can be inserted continuously in the fastener openings 148 and the fastener elongated slots for securing the back cover end members 140 and the central back cover plate 139 and define the back cover 124. The same fasteners can be used to secure the back cover 124 to the machinery frame as described above.

Turning now to FIGS. 9, 11, and 12, there is shown an embodiment of the telescopic front cover 126 engageable with the back cover 124 for forming the safety guard assembly 120 having an enclosure defined therein.

The telescopic front cover 126 includes three front cover members and, more particularly, a central front cover member 149 and two front cover end members 150 slidably engageable with the central front cover member 149. More particularly, each one of the front cover end members 150 is slidably engageable with the central front cover member 149 at a respective end thereof. The front cover end members 150 are telescopically displaceable relatively to the central front cover member 149 to adjust the length of the resulting front cover 126. Each one of the front cover end members 150 is substantially half obround shaped and the central front cover member 149 is substantially rectangular shaped. The front cover end members 150 are wider than the external width of the central front cover member 149 to be slidably engageable over the central front cover member 149 and vary the length of the front cover 126. Thus, the length of the overlapped portions of the front cover end members 150 with central front cover member 149 is adjustable to vary the length of the telescopic front cover 126 in accordance with the length of the transmission mechanism 122 which will be enclosed therein and with the length of the corresponding back cover 124.

The two front cover end members 150 and the central front cover member 149 have a U-shaped cross-section. In the embodiment shown, the back cover 124 is substantially flat and the front cover 126 has lateral walls 152 protruding substantially downwardly from a front wall 154 to define an inner space 155 wherein the transmission mechanism 122 can be inserted in the closed configuration of the safety guard assembly 120.

In an alternative embodiment (not shown), the front cover 126 can be substantially flat and the back cover 124 can have a substantially U-shaped cross-section with lateral walls protruding from a back wall to define the inner space 155 wherein the transmission mechanism 122 can be inserted in the closed configuration of the safety guard assembly 120. In still another embodiment (not shown), both the front cover 126 and the back cover 124 can have a substantially U-shaped cross-section with lateral walls protruding respectively from a front wall and a back wall to define the inner space 155.

The telescopic front cover 126 is superposed and secured to the telescopic back cover 124 with the transmission mechanism 122 extending therebetween to define the safety guard assembly 120.

More particularly, internal protruding flanges 156 extending from a lower portion of the lateral walls 152, close to lower edges of the central front cover member 149, are slidably insertable in a respective one of the guiding tracks 144 of the central back cover plate 139. More particularly, the internal protruding flanges 156 are slidably insertable in the guiding channels 172 of the guiding track 144.

Each one of the front cover end members 150 includes two guiding tracks 180, spaced-apart from one another, and located close to the open end of the front cover end members 150. The guiding tracks 180 define a guiding channel 182 in which an external protruding flange 184 of the central front cover member 149 is slidably insertable. The central front cover member 149 includes two external protruding flanges 184, each one being located on a respective side thereof, close to the lower edges. The external protruding flanges 184 are slidably insertable in the guiding channels 182 of the front cover end members 150 for varying the length of the resulting front cover 126.

Both the rear cover end members 140 and the front cover end members 150 include outer apertures 190, 192. When configuring the safety guard assembly 120 in the closed configuration, the outer apertures 190 of the rear cover end members 140 are in register with a respective one of the outer apertures 192 of the front cover end members 150. Fasteners such as bolts and screws can be inserted in the outer apertures 190, 192 in register to secure together the ear cover end members 140 and the front cover end members 150.

The alignment of the outer apertures 190 of the back cover end members 140 with the outer apertures 192 of the front cover end members 150 ensures that the length of the front cover 126 corresponds to the length of the back cover 124.

The back cover end members 140 are securable to the central back cover plate 139 and the resulting back cover 124 is securable to the machinery frame through fasteners inserted simultaneously through the fastener openings 148 and the fastener elongated slots. The front cover end members 150 and the central front cover member 149 are securable together through the guiding tracks 180 and the protruding flanges 184, i.e. a sliding male and female member engagement, and define the front cover 126. The front cover 126 is securable to the back cover 124 through fasteners insertable in the outer apertures 190, 192 of the back and front cover end members 140, 150 which are in register. The back and front covers 124, 126 define an enclosure in which a transmission mechanism 122 can be enclosed.

The safety guard assembly 120 is mounted to the machinery and can enclose its transmission mechanism 122 in a similar manner than the safety guard assembly 20.

In a non-limitative embodiment, the central back cover plate 139 and the central front cover member 149 can be made from an extrudable or castable polymers or metals such as aluminium, steel, and magnesium or from a bent section of metal. They can be cut to substantially the desired length in accordance with the length of the transmission mechanism that the safety guard assembly 120 will enclose. For final adjustment of the length of the safety guard assembly 120 in accordance with the length of the transmission mechanism, the overlapped portion of the end members 140, 150 with the central members 139, 149 can be adjusted.

In a non-limitative embodiment, the back cover end members 140 and the front cover end members 150 can be made from a substantially rigid polymer and castable metals such as aluminium, steel, and magnesium.

The width of the central back cover plate 139, the back cover end members 140, the central front cover member 149, and the front cover end members 150 can be adapted to the diameter of the rotary members 130, 134.

It is appreciated that the shape of the various components defined in the safety guard assembly 120 can vary greatly from the one shown in the figures and described above. Moreover, the mechanism used for the sliding engagement of the back and front cover members 139, 140, 149, 150 can vary from the ones shown in the figures and described above.

It is appreciated that the guard assemblies 20, 120 can include any number of back and front cover members. In an embodiment, the back and front cover members are engageable with one another and in a further embodiment, at least two of them are slidably engageable with one another.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the spirit or central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the spirit of the invention. The scope of the invention is therefore intended to be limited solely by the scope of the appended claims.

The invention claimed is:

1. A safety guard assembly for enclosing a flexible drive extending between a driving shaft and a driven shaft, the safety guard assembly comprising:

a back cover comprising a central back plate member with guiding tracks and two back cover end members slidably engageable with the central back plate member for varying a length of the back cover, each one of the back cover end members being engageable to a respective end of the central back plate member, the back cover having at least two shaft openings extending therethrough for receiving a respective one of the driving shaft and the driven shaft therein; and a front cover comprising a central front cover member with flanges and two front cover end members slidably engageable with the central front cover member for varying a length of the front cover, each one of the front cover end members being engageable to a respective end of the central front cover member, the front cover being securable to the back cover for defining an enclosure for the flexible drive;

wherein the central front cover member and the central back plate member are superposable to one another and slidably engageable with one another by inserting the flanges of the central front cover member in a respective one of the guiding tracks of the central back plate member, and wherein each one of the two front cover end members are superposable and securable to a respective one of the back cover end members.

2. A safety guard as claimed in claim 1, wherein the front cover end members comprise guiding tracks and the central front cover member comprises flanges slidably insertable in a respective one of the guiding tracks for adjusting the length of the front cover.

3. A safety guard as claimed in claim 1, wherein the central back plate member defines an internal channel and the back cover end members being slidably insertable in the internal channel for adjusting the length of the back cover and being securable to the central back plate member to the selected length.

4. A safety guard as claimed in claim 1, wherein each one of the shaft openings is defined throughout a respective one of the back cover end members.

5. A safety guard as claimed in claim 1, wherein each one of the front cover members comprises a front wall and lateral walls extending substantially downwardly from the front wall and defining an inner space.

6. A safety guard and transmission assembly securable to a machinery frame, comprising:
   a back cover comprising a central back plate member comprising guiding tracks and two back cover end members slidably engageable with the central back plate member and having a variable overlapping section for varying a length of the back cover, each one cover, each one of the back cover end members being engageable to a respective end of the central back plate member, the back cover having at least two shaft openings defined therethrough;
   a transmission including a driving shaft extending through a first one of the shaft openings, a driving rotary member mounted to the driving shaft, a driven shaft spaced-apart from the driving shaft and extending through a second one of the shaft openings, a driven rotary member mounted to the driven shaft and a flexible drive operatively engaged over the driving and driven rotary members; and
   a front cover comprising a central front cover member comprising flanges and two front cover end members slidably engageable with the central front cover member and having a variable overlapping section for varying a length of the front cover, each one of the front cover end members being engageable to a respective end of the central front cover member, the front cover being securable to the back cover for defining an enclosure for the flexible drive and the driving and driven rotary members,
   wherein the central front cover member and the central back plate member are superposable to one another and slidably engageable with one one another with the flanges being insertable in a respective one of the guiding tracks, and wherein each one of the two front cover end members are superposable and securable to a respective one of the back cover end members.

7. A safety guard and transmission assembly as claimed in claim 6, wherein the front cover end members comprise guiding tracks and the central front cover member comprises flanges slidably insertable in a respective one of the guiding tracks for adjusting the length of the front cover.

8. A safety guard and transmission assembly as claimed in claim 6, wherein the central back plate member defines an internal channel and the back cover end members being slidably insertable in the internal channel for adjusting the length of the back cover and being securable to the central back plate member to the selected length.

9. A safety guard and transmission assembly as claimed in claim 6, wherein each one of the shaft openings is defined throughout a respective one of the back cover end members.

10. A safety guard and transmission assembly as claimed in claim 6, the back cover end members and the central back plate member comprise a plurality of structural ribs.

11. A safety guard and transmission assembly as claimed in claim 6, wherein the central front cover member and the front cover end members comprises a front wall and lateral walls extending substantially downwardly from the front wall and defining an inner space.

\* \* \* \* \*